United States Patent [19]

Ewert

[11] Patent Number: 5,515,026
[45] Date of Patent: May 7, 1996

[54] TOTAL ALERT DRIVER SAFETY SYSTEM

[76] Inventor: Roger D. Ewert, 2085 Aqua Dr., Nekoosa, Wis. 54457

[21] Appl. No.: 189,074

[22] Filed: Jan. 28, 1994

[51] Int. Cl.$^6$ .................................................. G08B 3/00
[52] U.S. Cl. .................. 340/436; 340/384.1; 340/384.3; 116/22 A; 367/139
[58] Field of Search .................. 340/435, 436, 340/425.5, 384.1, 384.2, 384.3; 116/22 A; 367/139

[56] References Cited

U.S. PATENT DOCUMENTS

| | | | |
|---|---|---|---|
| 3,516,384 | 6/1970 | Will | 116/137 |
| 3,594,786 | 7/1971 | Schwer et al. | 340/384.3 |
| 3,683,113 | 8/1972 | Stewart | 340/384.2 |
| 3,775,743 | 11/1973 | Carter | 340/32 |
| 4,091,383 | 5/1978 | Rainville | 340/384 |
| 4,150,637 | 4/1979 | Penick | 116/58 |
| 4,437,428 | 3/1984 | Hoffelner | 116/28 |
| 4,998,091 | 3/1991 | Rezmer | 340/384 |
| 5,278,537 | 1/1994 | Carlo et al. | 340/384.1 |

FOREIGN PATENT DOCUMENTS

2192300  1/1988  United Kingdom ................ 340/384.3

Primary Examiner—John K. Peng
Assistant Examiner—Edward Lefkowitz
Attorney, Agent, or Firm—Lathrop & Clark

[57] ABSTRACT

A complete vehicle accident prevention system utilizing electromagnetic transmissions for the purpose of: 1) alerting drivers to the presence of certain unanticipated accident threats such as pedestrians, bicyclists, joggers, emergency vehicles, disabled vehicles, etc.; 2) alerting people using the roadway that a vehicle is approaching thereby inducing them to move to the side of the road. The system also utilizes a speaker assembly mounted on the vehicle to forwardly transmit a pre-programmed array of natural sounds having a frequency audible to the typical human ear for the purpose of inducing animals and people to vacate the path of the approaching vehicle. The controller may receive data from a radio direction finder to cause the display to indicate to the driver of the vehicle the relative position of a potential road hazard.

7 Claims, 4 Drawing Sheets

TOTAL ALERT DRIVER SAFETY SYSTEM

FIELD OF THE INVENTION

The present invention relates to automatic driver alert systems generally and more particularly to a system which can be mounted on a vehicle.

BACKGROUND OF THE INVENTION

Safety on our nation's roadways is an issue of ever increasing concern. Approximately 40,000 people were killed in automobile accidents during 1992. In an effort to reduce these high fatality numbers, the government has enacted strict automobile crash worthiness requirements. Although these requirements do provide greater safety for passengers involved in an accident, the best way to reduce automobile related injuries is to prevent accidents in the first place.

An effective method of avoiding accidents is the art of defensive driving. Defensive driving is based upon what is known in the driver's education field as the IPDE system. This acronym stands for "identify, predict, decide and execute." A driver must identify potential accident threats, predict how the threat will react, decide the appropriate course of action and execute the decided course.

The controlling factor governing the effectiveness of the IPDE system is the length of time available between the driver's identification of a potential threat and the driver's execution of the proper collision avoidance maneuver. The average reaction time for an alert driver is approximately ¾ of a second. This means that it takes ¾ of a second for the driver to identify the danger, predict how the danger will react, decide the appropriate course of action and execute the proper evasive action maneuver. During this ¾ of a second, the vehicle continues forward at a constant velocity. Therefore, a vehicle traveling at a speed of 65 miles per hour traverses approximately 71.5 feet from the time the driver identifies the danger until the driver executes an evasive action such as applying the brakes. Additionally, it takes the vehicle approximately 380 feet for the brakes to bring the vehicle to a complete stop. Therefore, an average vehicle travels approximately 451 feet from the time a driver identifies a potential danger until the vehicle can come to a complete stop. This stopping distance projected in front of the vehicle in called the vehicle danger zone. If a mobile hazard such as person or animal enters into this danger zone, the vehicle has no means of stopping before impact.

Under normal driving conditions, the driver can identify a potential danger and make the proper evasive maneuver long before the hazard enters into the danger zone. However, certain types of factors can impair the driver's ability to identify hazards. For example, environmental factors such as darkness, fog, rain, snow, glare, etc. can greatly reduce a driver's sight distance. Additionally, certain types of road characteristics such as curves, hills and blind intersections inherently impair visibility. Finally, the reality of human imperfection in the form of fatigue, daydreaming and distractions can substantially reduce a person's reaction time thereby increasing the length of the danger zone projected in front of the vehicle.

When a driver is experiencing a condition of impaired visibility as previously described, it is common for the driver's sight distance to be shorter than the vehicle's danger zone length for the particular speed at which the vehicle is traveling. Under these circumstances, the driver will be unable to identify an unexpected hazard in the roadway until it is too late to avoid an accident. Common types of unexpected mobile hazards include: emergency vehicles racing through intersections; disabled vehicles blocking traffic lanes; approaching trains; and joggers, bicyclists, snowmobilers, cross country skiers and pedestrians using roadways for recreational purposes. Additionally, wild and domestic animals routinely dart into the danger zones of approaching vehicles leaving the driver insufficient time to avoid impact.

Known accident prevention systems alert drivers to posted regulatory conditions of a stationary nature. However, these systems do not forewarn a driver of the presence of mobile hazards which may be a source of danger to the approaching vehicle. Additionally, these systems do not provide a means for alerting individuals and animals that may be in a hazardous location to vacate the path of an approaching vehicle. Several other systems transmit ultrasonic sound waves in front of the vehicle in order to induce animals to vacate the roadway. However, these systems are inaudible to humans. Additionally, certain studies have indicated that ultrasonic sound waves may not be an effective means of inducing animals to vacate the roadway. Trains have long utilizes alternating flashing lights, moving from side to side to prevent animal fixation on the bright lights, but train animal collisions persist.

What is needed is a vehicle accident prevention system that induces animals and people to vacate the path of an approaching vehicle while simultaneously alerting the driver that the vehicle is approaching a potential mobile safety hazard thereby inducing the driver to execute the appropriate evasive action.

SUMMARY OF THE INVENTION

The present invention is directed to a vehicle accident prevention system that induces animals and people to vacate the path of an approaching vehicle while simultaneously alerting the driver that the vehicle is approaching a potential mobile safety hazard thereby inducing the driver to execute the appropriate evasive action. The present invention coordinates alerting sounds with visual cues to induce instinctive reactions in animals to prevent collisions with vehicles.

The total alert system of this invention, hereinafter referred to as the MURCIBE™ (Multi-Universal Rectification Device for Conducing Instinctive Behavior in Your Environment) total alert system includes a number of individual components. The most important component is the central control and display unit which may be conveniently mounted for ready visibility on the dash of a car or truck. The control and display unit is connected to the vehicle power system and contains a radio transmitter and a radio receiver. The radio receiver is capable of receiving radio signals from transmitters which are carried by other vehicles, pedestrians or which are associated with road hazards. When the control and display unit detects a warning transmission from a road hazard transmitter, it illuminates a color coded symbol to alert the driver to the type of hazard he is approaching.

The control and display unit is also operably connected to the vehicle headlights and a forward-projecting audio speaker. The control and display device contains or is connected to a sound memory system and audio amplifier. It has the ability to interrupt power to the car radio and to flick the forward headlights.

The control and display unit also receives input from a foot pedal, and a transducer which monitors vehicle speed.

Thus, the control and display unit not only alerts the driver to an approaching car road hazard or pedestrian, but also contains active means for warning animals and pedestrians along the roadway. The warnings consist of preprogrammed natural sounds, such as clicks, snaps, cracks, ticks or the like. These sounds are readily understood by animals and pedestrians alike to indicate the approach of something, in this case, a vehicle, with the result that the animal or pedestrian, without being unduly alarmed, is alerted to the approaching vehicle. To prevent an animal from locking onto the headlights, they are flicked, not so as to dim them but so as to prevent an animal or human from locking onto the oncoming lights.

The pro-active operation of the system is initiated in one of three ways. First, a manual foot pedal triggers the sounds and flickering of the lights. Second, when the control and display unit senses that the car is moving over thirty-five miles per hour, the system broadcasts sounds and flicks the vehicle lights. Third, actuation may be in response to a transmitter mounted in a zone for which pro-active operational system will be advantageous, for example, a deer crossing zone, a pedestrian, or a pedestrian crossing.

It is an object of the present invention to provide a total alert system for improved safety of both the driver and occupants of vehicles and other persons, vehicles and animals situated on or along the roadway.

It is another object of the present invention to provide a total alert system which projects audible frequency naturally occurring noises to alert deer and pedestrians to the approach of a vehicle.

It is further object of the present invention to provide a driver alert system which is capable of broadcasting a distress signal.

It is yet another object of the present invention to provide a dash-mounted control and display unit for use with a total alert driver safety system.

Further objects, features, and advantages of the invention will be apparent from the following detailed description when taken in conjunction with the accompanying drawings.

DESCRIPTION OF THE PREFERRED EMBODIMENT

Figure 1:
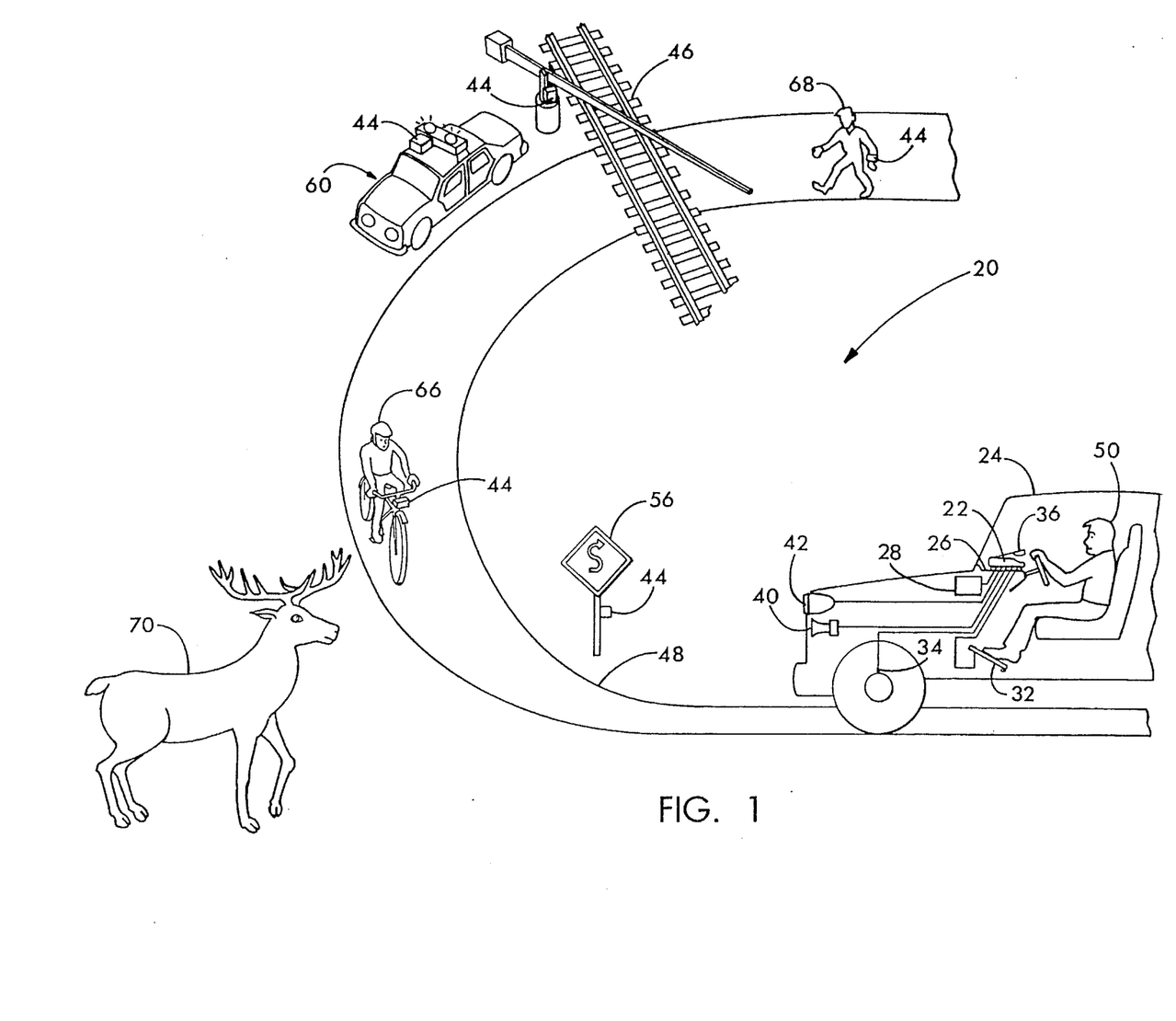
FIG. 1 is an illustrative, somewhat schematic view of the total alert driver safety system of this invention.

Referring more particularly to FIGS. 1–10, wherein like numbers refer to similar parts, a total alert system 20 for improving the safety of vehicle drivers, their passengers, and animals and persons on or near roadways is shown in FIG. 1. The system uses audible and visible cues to induce instinctive avoidance patterns in animals and humans.

As shown in FIG. 1, the system 20 includes a display and control unit 22 mounted in a car or vehicle 24. The control unit may be mounted for convenience on the vehicle dash 26. The control and display unit draws power from the car 24 fuse panel 28. The control unit will preferably draw power from the car radio circuit so as to switch power to the radio off and on. Thus, the car radio is under control of the display and control unit 22 (so as to be switched off in an emergency situation). The display and control unit 22 has an antenna 30, shown diagrammatically in FIG. 5, for receiving FM radio signals. The control unit also receives input from a manual switch, such as the floor foot switch 32 shown in FIG. 1.

The display and control unit 22 also receives input from a transducer 34 which is mounted to the vehicle to indicate vehicle speed The transducer may be mounted to the vehicle drive train. Alternatively, a feed may be taken directly from vehicles with electronic speed sensors.

Figures 2, 3:
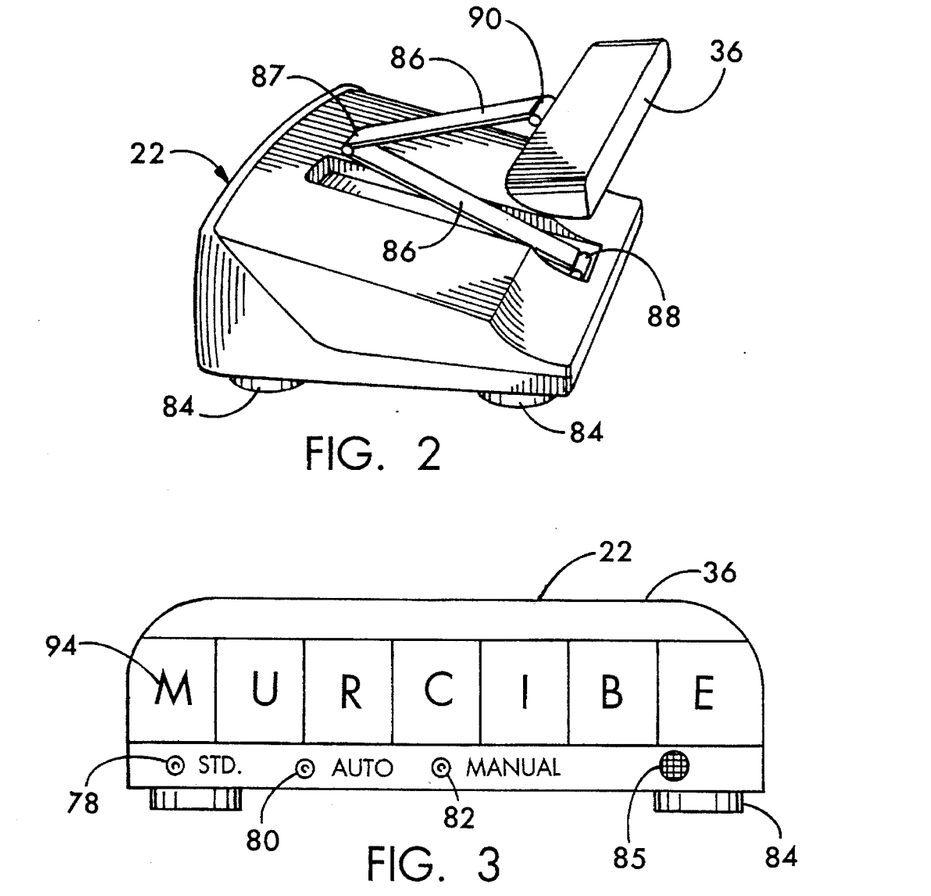
FIG. 2 is an isometric view of the display and control unit of the total alert driver safety system of FIG. 1.
FIG. 3 is a front elevational view of the display of the display and control unit of FIG. 1 wherein no indicator lamps are lit and the display is in the retracted, down position.
Figure 4:
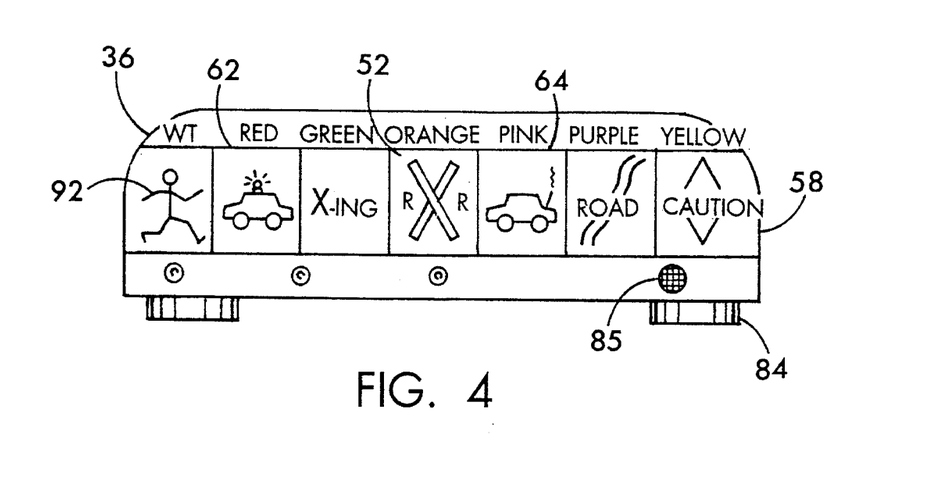
FIG. 4 is a front elevational view of the display of the display and control unit of FIG. 3 wherein the road hazard warnings are shown illuminated and thus visible, with the color of each indicator labelled.
Figure 5:
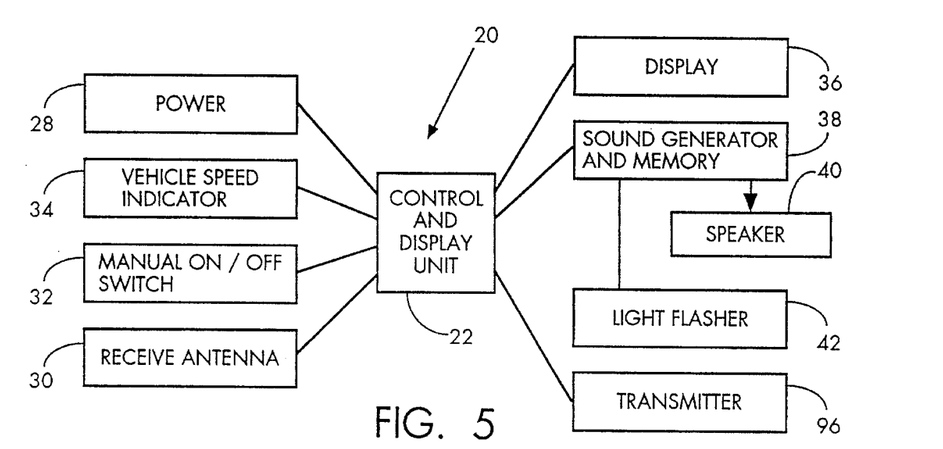
FIG. 5 is a block diagram of the inputs and outputs to the control and display unit.
Figure 6:
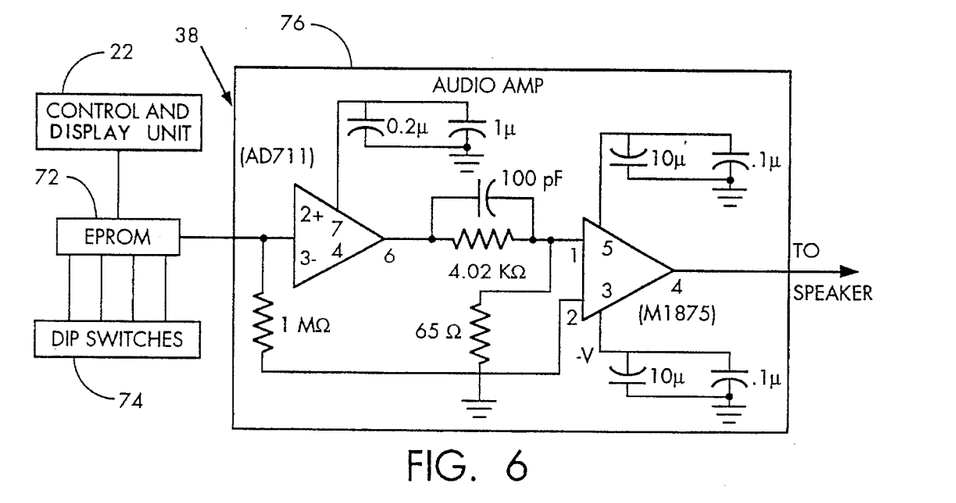
FIG. 6 a block diagram including a typical circuit diagram used for the audio amplifier of the sound and sound generator and memory unit of FIG. 5.

The display and control unit 22, as shown in FIG. 5, outputs information to a display 36, shown pictorially in FIGS. 2–4. The display and control unit 22 controls a sound generator and memory unit 38 which in turn drives a speaker 40 and headlight flickerer 42.

The total alert system 20 employs fixed and mobile transmitters which work in cooperation with the display and control unit to increase the overall safety of the traffic system. Crystal-controlled radio frequency FM transmitters are associated with particular road hazards. For example, a transmitter 44 of a particular frequency is mounted at a railroad crossing 46. The transmitter 44 at the railroad crossing 46 is connected to the railroad crossing signal so that when an approaching train activates the signal, the transmitter 44 is also activated. The display and control unit 22 which is mounted in a car 24 which is moving along a roadway 48 in the vicinity of the railroad crossing 46 receives the signal from the transmitter 44 and alerts the driver 50 by illuminating a warning 52, as shown in FIG. 4., that he may be approaching an occupied railroad crossing 46. The power of the transmitters and the receiving antenna are selected to achieve a radius of approximately 300 yards around each hazard. Such a distance is sufficient to allow safe stopping in anticipation of a hazard while not being so large as to prevent spurious warnings to vehicle operators who are not in sufficient proximity to a hazard to merit concern.

Figure 7:
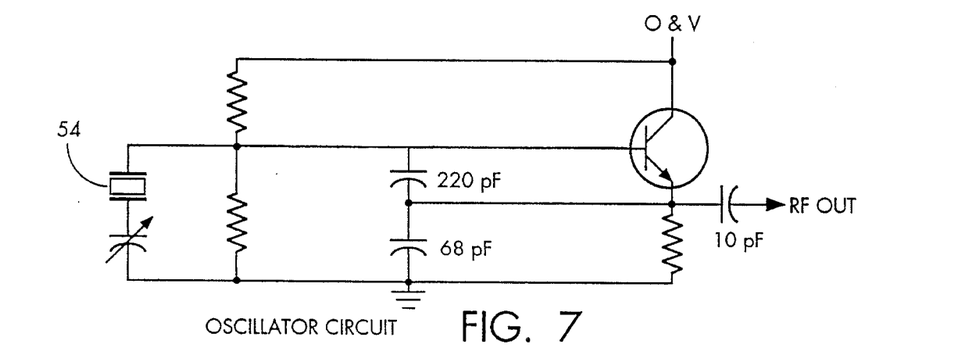
FIG. 7 is a circuit diagram of a typical crystal oscillator which forms part of the total alert driver safety system of FIG. 1.

FIG. 7 shows a typical oscillator circuit which may be employed in a small RF transmitter 44. The oscillator contains a crystal 54 which governs the frequency of transmission of the RF transmitter 44. Thus, the crystal 54 in a given radio transmitter 44 may be picked so that a given crystal frequency is indicative of a particular road hazard. In this way, the control and display unit can recognize particular road hazards by their characteristic radio frequency.

As shown in FIG. 4, the radio transmitter 44 may be associated with caution signs 56 which continuously broadcast a relatively short-range signal, so that as a driver approaches a cautionary sign, the display and control unit 22 may illuminate a yellow caution warning 58, as shown in FIG. 4.

In addition to fixed transmitters, pedestrians and bicyclists may wear miniaturized transmitters on wristbands, belts, helmets, or packs, which emit a low-power but continuous signal which is detectable by the display and control unit. The transmitter may also be incorporated into a wristwatch for dual function. In addition, transmitters may be fitted to animal collars to provide a warning in the event that pets or livestock equipped with a transmitter collar approach a roadway. Preferably the pedestrian and bicyclist transmitters will be provided with a radio receiver to receive signals from the transmitter within each vehicle equipped with the alert system 20. The receiver may provide the detected signal to an oscillator to emit a beeping sound when a vehicle approaches within a hazardous proximity. The oscillator may be wired to interrupt sound emitted through the headset of a conventional walk-along tape player or receiver. For bicyclists, in addition to a beeping sound, the receiver may activate a light-emitting-diode mounted on the bicyclist's helmet to be visible as he is looking forward to add visual as well as audible cues to approaching traffic.

The control and display unit will preferably be provided with a two-position switch directing the unit to switch between pedestrian alert transmitter signal and a vehicle alert transmitter signal.

An emergency vehicle 60 may be equipped with a transmitter which is activated by turning on the vehicle's flashing lights or by a manual switch on the control unit. Thus, with the flashing lights of a police car, emergency road vehicle or maintenance vehicle, a warning is broadcast to the display and control unit 22 in vehicles 24 and the display and control unit 22 displays a red emergency vehicle symbol 62, as shown in FIG. 4.

The emergency vehicle 60 shown in FIG. 1, as well as all automobiles using the roadway, may employ transmitters 96 which are active whenever the vehicle ignition is turned on. Control and display units for emergency vehicles may be identical to those used in passenger vehicles, but will be supplied with a switch between pedestrian alert and emergency vehicle alert, this feature may be achieved by substituting an "emergency vehicle" type crystal for the "vehicle alert" crystal of a common unit. Vehicles equipped with the MURCIBE™ system 20 will have a radio transmitter 96 as shown in FIG. 5. Thus a disabled or stranded vehicle under any conditions, but particularly in foggy conditions, on hilly or curvy roads, where it is not possible to see ahead on the road, or under other hazardous driving conditions, the transmitter 96 may be activated to light an indicator light 64 on the display of another MURCIBE equipped vehicle to communicate to the driver 50 of the other vehicle via the display 36 the presence of a disabled vehicle. Further, the RF transmitters 96 employed on cars can be designed to broadcast with more power and at a different frequency when the vehicle hazard lights have been engaged, thus indicating to vehicles in the vicinity through, for example, a pink distressed vehicle symbol 64, shown in FIG. 4.

The total driver alert system 20 not only warns the driver 50 of a vehicle 24 or road hazard in its vicinity, but also controls and activates a sound and light system which warns bicyclists 66, pedestrians 68 and deer 70 of the approach of the vehicle 24. The sound and light system takes advantages of the natural sensitivity of animals to certain sounds, and sounds which are connected with lights. By appealing to the animals natural behavior patterns, instinctive avoidance activities are induced. Prior art alert systems which relied on unusual or unnatural sounds, typically have the effect of startling or confusing an animal. The signals of the present invention are natural, and hence result in an unthinking, instinctual response.

The approach warning system has two components, a sound generation component 38 and a light flickerer 42. Prior art warning systems have attempted to use ultrasonic sound to scare off deer and so reduce the possibility of vehicle collision with a deer. These systems have not been proven effective. The total alert system 20 utilizes natural sounds in the audible frequencies 16 to 20,000 Hz. More particularly, the system utilizes sounds which actually occur in nature. Instead of a simple tone or warbling siren sound, which can induce panic in an animal, pedestrian or bicyclist, causing them to veer into the path of the oncoming vehicle 24, the total alert system 20 utilizes a sound generator which produces natural sounds. The sounds are stored in a memory 72, which is shown schematically in FIG. 6 as an EPROM (erasable programmable read-only memory). Alternatively, other appropriate integrated circuits (IC's) may be employed.

The EPROM is used to store natural sounds such as clicks, snaps, cracks, pops, crunches, ticks, clacks, zaps or the like. The EPROM is a conventional electronic device which can also be used to store the sound of sirens, beeps and even voice messages. A series of dip switches 74, indicated schematically in FIG. 6, can be used to select the sound or sounds which are broadcast over the speakers 40. Preferably, each dip switch will have three settings: a higher-pitched sound, off, and a lower pitched sound. The dip switches may be configured to produce variable sound patterns and intervals which periodically may be reprogrammed to prevent deer and other animals from growing accustomed or "immune" to the alerting signal. An informational pamphlet, containing suggested settings may be supplied with the apparatus to prove a more user-friendly system.

An override switch may be provided when alternate sounds are desired. In this way, for instance, when an ordinary vehicle is being used temporarily as an emergency vehicle, for example, to transport someone to the hospital, a siren sound may be projected through the speakers 40.

For use in alerting deer and other animals, including birds and large and small mammals, natural sounds are particularly effective, as they trigger the deer or other animal's natural instincts, causing it to flee the vicinity of the noise. These natural sounds do not induce panic, but rather a natural avoidance instinct.

One way of attaining such natural sounds for use in the total alert system 20 is to record the walking of a person or animal in the woods or fields. The sounds so recorded may then be loaded onto a computer for isolating the individual sounds corresponding to clicks, snaps, cracks, pops, etc. Once the sounds are isolated, they can be filtered, digitized and then downloaded to the EPROMs 72, which are installed in the sound generation memory unit 38 of the total alert system 20.

It may also be possible to conserve EPROM memory by finding a mathematical function which nearly simulates a particular natural sound and utilizing the stored formula to generate a recurring wave form which in turn may be used to feed the audio amplifier 76, which drives the speakers 40.

In addition to the sound generator 38, the lights of the vehicle may be flicked momentarily and repeatedly, to create a high frequency flickering effect, which in coordination with the sound, would reduce the likelihood that a deer or other animal will fixate on the oncoming lights. This facilitates the deer's natural response to the broadcast sounds.

Figure 8:
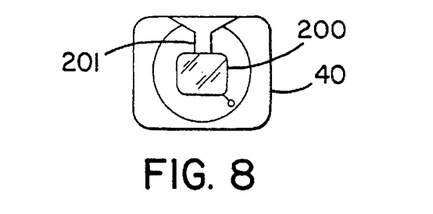
FIG. 8 is a front elevational view of the speaker of the system of FIG. 1 with an optional strobe light mounted thereon.
Figure 9:
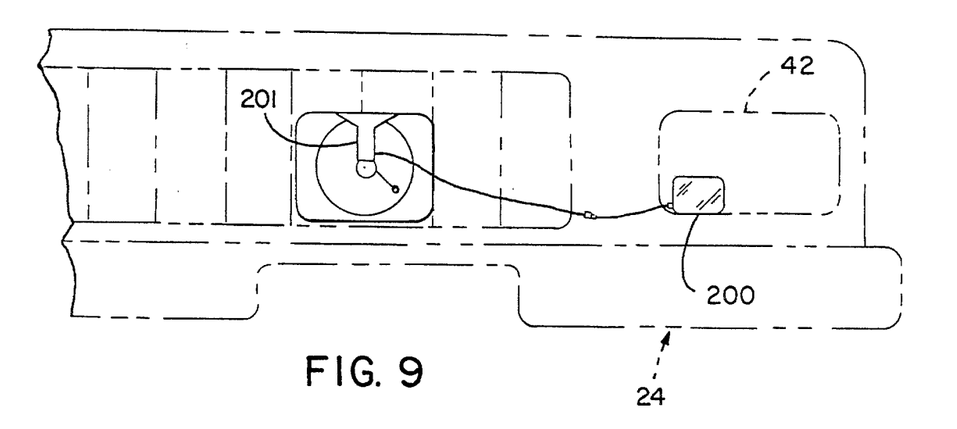
FIG. 9 is a front elevational view of the apparatus of FIG. 8 with the strobe light mounted to a vehicle at a location removed from the speaker.

Alternatively, as shown in FIGS. 8 and 9, a strobe light 200 may be mounted on a holder 201 within the speaker 40 mounted to the front of the vehicle 24. The strobe light 200 is supplied with power by a 12 volt line from the car battery. The strobe light 200 may be triggered directly by the controller, or may be triggered by a signal to the speaker 40. Thus the strobe light will flick on at the onset of each burst of sound from the speaker. The flickering strobe light will thus flicker in synchronization with the sounds, preventing an animal from fixating on the vehicle's lights. As shown in FIG. 9, the strobe light is connected by a short wire to the speaker, allowing a user to optionally mount the strobe light to a position remote from the speaker, for example in proximity to the headlamp 42.

Of course, not all pedestrian and bicyclists will necessarily be equipped with transmitters. It is unlikely, though not inconceivable, that deer will be equipped with transmitters. In order to respond to this real world situation, the control and display unit 36 has three modes shown by indicators: stand-by mode 78, auto mode 80 and manual mode 82. The display and control unit 22 is connected to the car power system 28 through the car radio breaker or fuse, and is activated as indicated by on-light 85 whenever the car ignition is on. A special fuse may be inserted in the vehicle fuse box, and the radio fused within the control unit, or in the line to the control unit.

The display and control unit 22 normally assumes the stand-by condition. In the stand-by condition, the control and display unit 22 receives warnings from radio transmitters 44 mounted in association with road hazards, emergency vehicles, stranded vehicles, cars, bicyclists, etc. When a road hazard is detected by means of the broadcast signal from the radio transmitter 44, and indicates a situation where a warning should be given, the display and control unit 22 activates the sound generation unit 38 and broadcasts and flicks the headlights as appropriate.

The vehicle has a foot switch which may be depressed to put the display and control unit 22 into the manual mode as shown by the manual mode indicator 82. In the manual mode, the control and display unit 22 drives the sound generator, broadcasting sounds and flickering the lights as appropriate. When the manual foot pedal 32 is released, the display and control unit 22 returns to the stand-by or automatic modes.

The display and control unit 22 receives information form a transducer 34 which indicates vehicle speed. When the vehicle speed exceeds thirty-five miles an hour, the display and control unit 22 switches over to automatic. This causes a continual broadcast of audible sounds, thus warning deer, other animals and pedestrians of the vehicle's approach.

The display and control unit 22, best shown in FIG. 2, may be mounted to a vehicle dash by resilient feet 84 which may have adhesive on their lower surfaces. The display and control unit 22 may also be mounted by a bracket (not shown) which clips or screws to the dash. The display 36 is conveniently mounted on pivot arms 86 which are joined by pivot 87 and connect to a body-mounted pivot 88 and a display mounted pivot 90. This allows the positioning of the display for optimal visibility by the driver. In a preferred embodiment the display 36 will include a number of pictographic warning symbols 92, as shown in FIG. 4. The alert symbols have an easily remembered and distinctive color to facilitate quick recognition by the driver. For example a white display indicating the presence of a pedestrian; a red display 62 indicating the presence of an emergency vehicle; a green display indicating the presence of a crossing zone; an orange display 52 indicating the presence of a railroad crossing; a pink display 64 indicating the presence of a disabled vehicle; a purple display indicating hazardous road conditions; and a yellow display 58 indicating that caution is called for.

As shown in FIG. 3, when the individual warnings are off, the front of the display may conveniently have a trademark symbol, for example "MURCIBE," composed of frosted letters on the front of the display. Behind the individual frosted letters are the pictographic symbols 92. These are backed by a light-emitting diode or electro-luminescent lights of various colors. These, when illuminated, render the trademark symbol invisible. Thus, the trademark 94 is plainly visible when a driver enters a vehicle 22, which alerts and informs the driver of the type of alert system installed in the vehicle, yet this trademark does not interfere with the visibility or readability of the warning icons when they are illuminated. The control unit 22 may be provided with a photodetector, not shown, which detects the high light levels of daytime driving conditions and increases the light output of the display to ensure visibility. When the photodetector detects a low level of ambient light within the vehicle, the intensity of the display may be reduced to prevent eyestrain or distracting light intensity.

A power adapter may be utilized to turn down or off the radio or other players, such as tape players and CDs, when a caution signal is received by the display and control unit 22. Further, the user-friendliness of the total alert system 20 is facilitated by the simplicity of installing the display and control unit 22 by connecting it through a blade-type fuse adapter so as to draw power off the fuse box as required.

It should be understood that the transmitting units 44 may consist of a crystal and a HC-18U holder, with frequency modulation or FM radio signals utilizing different frequencies for different uses or transmission of various alerts, or to let the driver know of different circumstances he needs to be aware of.

It should also be understood that other types of transmitters, for instance AM, could be used, and that the type of hazard could be signalled by a digital word which would be indicative of a particular hazard rather than utilizing the frequency of the transmitter to indicate the type of hazard.

It should also be understood that although the display and control unit 22 is shown in FIG. 4 with a particular array of icons, other icons with various color codings could be used. In addition, a liquid crystal matrix display could be used to display an infinite variety of warning symbols as well as written messages.

It should be understood that the lights will preferably be flicked at the exact moment the sound is emitted from the emitting speakers. The reason for this is to relate the sight and sound, thus alerting the animals that something is coming. One way of doing this is to vary the voltage in the light bulb, thereby meeting state requirements, so that the bulb will not be shut off, nor should the momentary flickering distract other users or drivers. However, the flickering will allow deer to realize that something is coming by sight, and by noticing the flickering of the bulb and by the sound of the sound warning system.

An exemplary speaker 40 for use with the warning system 22 would be a weather-proof speaker approximately three inches in diameter and small enough to fit between the radiator and the grill of almost any vehicle.

Figure 10:
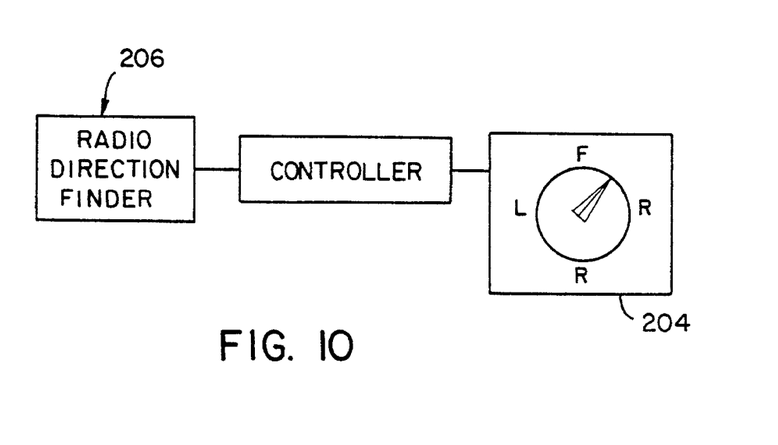
FIG. 10 is a schematic view of a direction-indicating accessory for the total alert driver safety system of this invention.

An accessory for the warning system 22 is an alert direction indicator 206, shown schematically in FIG. 10. In certain circumstances, particularly within urban areas, an automobile may be within range of a number of general hazards, such as pedestrians, stalled vehicles, emergency vehicles, and railway crossings, which are not an immediate hazard to the driver. By supplying a direction indicator 206, a driver may exercise a lowered level of caution with respect to hazards which are not in his immediate path. The direction indicator 206 includes a radio direction finder which detects in a conventional manner the direction of greatest intensity of radio broadcasts emitted by the hazard, from which the direction of the hazard may be deduced. The direction information is transmitted to the controller 22 which controls a direction display 204 which may consist of LED indicators to show whether the radio transmission is coming from in front of the vehicle, behind the vehicle, or to the left or the right. Alternatively a liquid crystal matrix display may generate a compass face signal indicating the direction of origin of the signal.

The display and control unit is preferably provided with a small internal speaker to generate warning tones to accompany the visual displays. However, in an alternative embodiment the display and control unit may be provided with a conventional voice modulator or integrated circuits and programming to enable the control unit to audibly pronounce the various warnings carried on the display, for example, "Caution, pedestrian.".

It should also be understood that although the sensor to detect vehicle speed 34 is shown in FIG. 1 to be a wheel mounted transducer which detects the rate of wheel rotation, the transducer could measure wind speed or have a pick-up which receives the speedometer reading from the vehicle computer. Calibration of a wind speed or other types of sensor could be accomplished by driving the vehicle at the desired speed for initiating automatic functioning of the display and control unit 22 and pushing a set button (not shown) which would cause the sensor output to be remembered as the initiating speed for the transition from stand-by to automatic function.

It should be understood that the dip switches may be set to use specific pre-programmed sounds which are particularly effective in a user's area and which pertain to a particular animal (deer, bear, turkey, etc.) the driver wishes to alert to his presence. As those who often drive rural highways know, the migration of various animals tends to be seasonally dependent. Thus, the programming of the alert system 20 may be varied readily to adjust to this seasonal abundance of wild animals.

It should be understood that the transmitters may be varied in distance, some transmitters being equipped with more power and a larger antenna for transmission at greater distances, or others being composed of the same parts may be allowed to transmit a shorter distance, such as two-hundred yards by limiting power or antenna size. The sound emitter can be programmed to amplify the sound for specific needs, such as for trucks or vehicles with loud road noises.

It should also be understood that the display and control unit 22 may optionally be used to prevent vehicle theft by incorporating a user code which must be transmitted or entered into the display and control unit 22 when the vehicle is entered. If this unique code is not transmitted or entered into the display unity, a separate alert system transmitter can transmit a signal which will read "stolen vehicle" on an optional display cube attached to the displays of MURCIBE units in police cars and other equipped vehicles. The result is that all cars equipped with the total alert system 20 would be alerted to the presence of a vehicle that is stolen. This, in combination with the fact that many cars today are equipped with mobile phones, could result in speedy, almost instantaneous apprehension of vehicles which are stolen.

It should be understood that the invention is not limited to the particular construction and arrangement of parts herein illustrated and described, but embraces such modified forms thereof as come within the scope of the following claims.

I claim:

1. An animal collision avoidance system for a vehicle which travels at a velocity, the system comprising:
   a) a speaker mounted to the vehicle to project sound frontwardly of the vehicle;
   b) a means for inducing instinctive avoidance reaction in an animal, the means including a controller connected to the speaker to cause the speaker to selectably emit a programmed array of non-panic inducing sound waves, wherein a substantial portion of the sound waves are in an audible range consisting of frequencies less than 20,000 Hz, and wherein said sound waves are detectable by animals ahead of the vehicle to induce instinctive avoidance activities in said animals to alert them to the approach of said vehicle; and
   c) means for activating the controller to cause the speaker to emit said sound waves, whereby said audible sound emissions are selectably halted, wherein the means for activating comprises a transducer mounted within the vehicle which determines the velocity of the vehicle, and wherein detected velocities of a preselected level bring about emission of sound waves.

2. An animal collision avoidance system for a vehicle comprising:
   a) a speaker mounted to the vehicle to project sound frontwardly of the vehicle:
   b) a controller connected to the speaker to cause the speaker to selectably emit a pre-programmed array of sound waves, wherein a substantial portion of the sound waves are in an audible range consisting of frequencies less than 20,000 Hz, and wherein said sound waves are detectable by animals ahead of the vehicle to induce instinctive avoidance activities in said animals to alert them to the approach of said vehicle;
   c) means for activating the controller to cause the speaker to emit said sound waves; and
   d) a headlight mounted to the vehicle to direct light frontwardly of the vehicle, wherein the headlight is electrically connected to the controller to flicker at the same time as sound waves are emitted from the speaker.

3. An animal collision avoidance system for a vehicle comprising:
   a) a speaker mounted to the vehicle to project sound frontwardly of the vehicle;
   b) a controller connected to the speaker to cause the speaker to selectably emit a pre-programmed array of sound waves, wherein a substantial portion of the sound waves are in an audible range consisting of frequencies less than 20,000 Hz, and wherein said sound waves are detectable by animals ahead of the vehicle to induce instinctive avoidance activities in said animals to alert them to the approach of said vehicle;

c) means for achieving the controller to cause the speaker to emit said sound waves; and d) a strobe light mounted to the vehicle, wherein the strobe light is activated by the controller to flicker in synchronization with the pre-programmed array of sound waves.

4. An animal collision avoidance system for a vehicle comprising:

a speaker mounted to the vehicle to project sound frontwardly of the vehicle;

b) a controller connected to the speaker to cause the speaker to selectably emit a pre-programmed array of sound waves, wherein a substantial portion of the sound waves are in an audible range consisting of frequencies less than 20,000 Hz, and wherein said sound waves are detectable by animals ahead of the vehicle to induce instinctive avoidance activities in said animals to alert them to the approach of said vehicle; and c) means for activating the controller to cause the speaker to emit said sound waves; and d) a strobe light mounted to the vehicle, wherein the strobe light is activated at the onset of a sound wave emitted by the speaker.

5. An animal collision avoidance apparatus for mounting on a vehicle, the apparatus comprising:

a) a speaker mounted to project sounds frontwardly of the vehicle, wherein the sounds emitted are at frequencies less that 20,000 Hz, said sounds being thus audible to a human ear;

b) an electronic controller, which controls the speaker such that the said sounds emitted are naturalistic sounds, said emitted naturalistic sounds being selected to induce instinctive avoidance reactions in animals; and c) wherein the vehicle includes at least one headlight, and wherein the controller is electronically connected to the headlight, and wherein the controller operates to activate said headlight to flicker in unison with the audible emissions of the speaker.

6. An animal collision avoidance apparatus for mounting on a vehicle which travels at a velocity, the apparatus comprising:

a) a speaker mounted to project sounds frontwardly of the vehicle, wherein the sounds emitted are at frequencies less than 20,000 Hz, said sounds being thus audible to a human ear;

b) a means for inducing instinctive avoidance reactions in animals which includes an electronic controller, which controls the speaker such that the said sounds emitted are naturalistic sounds, said emitted naturalistic sounds being selected to avoid inducing panic in animals and pedestrians; and c) a speed transducer mounted to the vehicle which detects the velocity of the vehicle, wherein the speed transducer transmits data regarding vehicle velocity to the controller, and wherein the controller automatically activates the speaker when the vehicle velocity exceeds a predetermined level.

7. An animal collision avoidance apparatus for mounting on a vehicle which travels at a velocity, the apparatus comprising:

a) a speaker mounted to project sounds frontwardly of the vehicle, wherein the sounds emitted are at frequencies less that 20,000 Hz, said sounds being thus audible to a human ear;

b) an electronic controller, which controls the speaker such that the said sounds emitted are naturalistic sounds, said emitted naturalistic sounds being selected to induce instinctive avoidance reactions in animals; and c) a speed transducer mounted to the vehicle which detects the velocity of the vehicle, wherein the speed transducer transmits data regarding vehicle velocity to the controller, and wherein the controller automatically activates the speaker when the vehicle velocity exceeds a predetermined level, wherein the sounds are emitted at a volume, and wherein the controller increases the volume of the sound emitted from the speaker as the vehicle velocity detected by the transducer increases.

\* \* \* \* \*